United States Patent
Kato

(10) Patent No.: US 11,969,993 B2
(45) Date of Patent: Apr. 30, 2024

(54) SETTING DEVICE, NON-TRANSITORY COMPUTER-READABLE RECORDING MEDIUM, AND SETTING METHOD

(71) Applicant: BROTHER KOGYO KABUSHIKI KAISHA, Nagoya (JP)

(72) Inventor: Shinya Kato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 107 days.

(21) Appl. No.: 17/810,939

(22) Filed: Jul. 6, 2022

(65) Prior Publication Data

US 2023/0066573 A1    Mar. 2, 2023

(30) Foreign Application Priority Data

Aug. 31, 2021    (JP) ................................. 2021-140695

(51) Int. Cl.
     *B41J 2/045*      (2006.01)

(52) U.S. Cl.
     CPC ....... *B41J 2/04505* (2013.01); *B41J 2/04586* (2013.01)

(58) Field of Classification Search
     CPC .. B41J 2/04505; B41J 2/04586; B41J 2/2135; B41J 2/2146; G06K 15/027
     See application file for complete search history.

(56) References Cited

U.S. PATENT DOCUMENTS

| | | |
|---|---|---|
| 2007/0296752 A1 | 12/2007 | Maruo et al. |
| 2013/0278670 A1 | 10/2013 | Tanase et al. |
| 2013/0328969 A1 | 12/2013 | Azuma et al. |
| 2014/0292860 A1* | 10/2014 | Furuhata ................. B41J 2/155 347/13 |

FOREIGN PATENT DOCUMENTS

| | | |
|---|---|---|
| JP | 2008001052 A | 1/2008 |
| JP | 2013223988 A | 10/2013 |
| JP | 2014012396 A | 1/2014 |
| JP | 2016135559 A | 7/2016 |
| JP | 2018094821 A | 6/2018 |

* cited by examiner

*Primary Examiner* — Lisa Solomon
(74) *Attorney, Agent, or Firm* — Scully, Scott, Murphy & Presser, PC

(57) ABSTRACT

A setting device for a print engine is configured to cause the print engine to print a specific image including a first image to be printed using first nozzles of a first head unit and a second image to be printed using second nozzles of a second head unit, receive relative position information determined based on the printed specific image, the relative position information including information indicating a positional deviation amount in a specific direction between the first nozzles and the second nozzles, and set, based on the relative position information, use nozzles to be used for printing and non-use nozzles not to be used for printing among the first nozzles and the second nozzles within a range in which a first range where the first nozzles are located and a second range where the second nozzles are located overlap with each other.

11 Claims, 13 Drawing Sheets

POSITIONAL DEVIATION AMOUNT ΔXa=0

| CANDIDATE PAIR | | DISTANCE IN CONVEYING DIRECTION |
|---|---|---|
| FIRST HEAD UNIT 241 | SECOND HEAD UNIT 242 | |
| A5 | B0 | 20 |
| A6 | B1 | 20 |
| A7 | B2 | 18 |  ← ADOPT
| A8 | B3 | 38 |
| A9 | B4 | 18 |
| A10 | B5 | 36 |

POSITIONAL DEVIATION AMOUNT ΔXa=-5

| CANDIDATE PAIR | | DISTANCE IN CONVEYING DIRECTION |
|---|---|---|
| FIRST HEAD UNIT 241 | SECOND HEAD UNIT 242 | |
| A10 | B0 | 28 |  ← ADOPT

POSITIONAL DEVIATION AMOUNT ΔXa=+5

| CANDIDATE PAIR | | DISTANCE IN CONVEYING DIRECTION |
|---|---|---|
| FIRST HEAD UNIT 241 | SECOND HEAD UNIT 242 | |
| A0 | B0 | 28 | ←------ ADOPT
| A1 | B1 | 28 |
| A2 | B2 | 28 |
| A3 | B3 | 28 |
| A4 | B4 | 28 |
| A5 | B5 | 28 |
| A6 | B6 | 28 |
| A7 | B7 | 28 |
| A8 | B8 | 28 |
| A9 | B9 | 28 |
| A10 | B10 | 28 |

FIG. 4C

POSITIONAL DEVIATION AMOUNT ΔXb=0

| CANDIDATE PAIR | | DISTANCE IN CONVEYING DIRECTION (mm) |
|---|---|---|
| SECOND HEAD UNIT 242 | THIRD HEAD UNIT 243 | |
| C5 | D0 | 36 |
| C6 | D1 | 36 |
| C7 | D2 | 38 |
| C8 | D3 | 18  ADOPT |
| C9 | D4 | 38 |
| C10 | D5 | 20 |

POSITIONAL DEVIATION AMOUNT ΔXb=-5

| CANDIDATE PAIR | | DISTANCE IN CONVEYING DIRECTION |
|---|---|---|
| SECOND HEAD UNIT 242 | THIRD HEAD UNIT 243 | |
| C10 | D0 | 28  ADOPT |

POSITIONAL DEVIATION AMOUNT ΔXb=+5

| CANDIDATE PAIR | | DISTANCE IN CONVEYING DIRECTION |
|---|---|---|
| SECOND HEAD UNIT 242 | THIRD HEAD UNIT 243 | |
| C0 | D0 | 28 |
| C1 | D1 | 28 |
| C2 | D2 | 28 |
| C3 | D3 | 28 |
| C4 | D4 | 28 |
| C5 | D5 | 28 |
| C6 | D6 | 28 |
| C7 | D7 | 28 |
| C8 | D8 | 28 |
| C9 | D9 | 28 |
| C10 | D10 | 28 ← ADOPT |

FIG. 6C

FIRST REFERENCE TABLE RTa
(BETWEEN FIRST HEAD UNIT 241 AND SECOND HEAD UNIT 242)

| POSITIONAL DEVIATION AMOUNT | BOUNDARY NOZZLE PAIR | |
|---|---|---|
| | FIRST HEAD UNIT 241 | SECOND HEAD UNIT 242 |
| -5 | A10 | B0 |
| -4 | A10 | B1 |
| -3 | A9 | B1 |
| -2 | A7 | B0 |
| -1 | A7 | B1 |
| 0 | A7 | B2 |
| +1 | A5 | B1 |
| +2 | A7 | B4 |
| +3 | A3 | B1 |
| +4 | A5 | B4 |
| +5 | A0 | B0 |

SECOND REFERENCE TABLE RTb
(BETWEEN SECOND HEAD UNIT 242 AND THIRD HEAD UNIT 243)

| POSITIONAL DEVIATION AMOUNT | BOUNDARY NOZZLE PAIR | |
|---|---|---|
| | FIRST HEAD UNIT 241 | SECOND HEAD UNIT 242 |
| -5 | C10 | D0 |
| -4 | C9 | D0 |
| -3 | C8 | D0 |
| -2 | C10 | D3 |
| -1 | C9 | D3 |
| 0 | C8 | D3 |
| +1 | C4 | D0 |
| +2 | C8 | D5 |
| +3 | C9 | D7 |
| +4 | C8 | D7 |
| +5 | C10 | D10 |

FIG. 11

SETTING DEVICE, NON-TRANSITORY COMPUTER-READABLE RECORDING MEDIUM, AND SETTING METHOD

REFERENCE TO RELATED APPLICATIONS

This application claims priority from Japanese Patent Application No. 2021-140695 filed on Aug. 31, 2021. The entire content of the priority application is incorporated herein by reference.

BACKGROUND ART

Aspects of the present disclosure relate to a setting for a print engine provided with a print head including a plurality of head unit.

In a printing apparatus that performs printing using a print head provided with a plurality of nozzles for ejecting ink, the print head may include a plurality of head units. There has been known a technique for printing one raster line using nozzles of two head units. In this technique, a nozzle to be associated with one raster line is determined using printed test patterns in consideration of installation errors of the two head units.

However, the above-mentioned conventional technique only takes into account a case where a plurality of nozzles for ejecting ink of the same color are arranged in a line in the head unit. Therefore, deterioration of image quality may not be sufficiently suppressed depending on the configuration of the head unit.

DESCRIPTION

At least one aspect of the present disclosure is advantageous to provide a new technique for suppressing degradation in image quality of an image printed by a print engine which uses a print head having a plurality of head units.

According to aspects of the present disclosure, there is provided a setting device for a print engine including a print head provided with a plurality of head unit including a first head unit provided with N1 first nozzles, N1 being an integer of 4 or more, located at positions different from each other in a specific direction and a second head unit provided with N2 second nozzles, N2 being an integer of 4 or more, located at positions different from each other in the specific direction. The first head unit and the second head unit are located at positions different from each other in an intersecting direction intersecting with the specific direction. A first range includes a first overlapping range and a first non-overlapping range. The first overlapping range overlaps with a second range in the specific direction. The first non-overlapping range does not overlap with the second range in the specific direction. The N1 first nozzles are located in the first range. The N2 second nozzles are located in the second range. The N1 first nozzles and the N2 second nozzles are nozzles that eject ink of the same color. The N1 first nozzles include two or more nozzle groups being at positions different from each other in the intersecting direction. The N2 second nozzles include two or more nozzle groups being at positions different from each other in the intersecting direction. The setting device is configured to cause the print engine to print a specific image, the specific image including a first image to be printed using at least some of the N1 first nozzles and a second image to be printed using at least some of the N2 second nozzles, receive relative position information determined based on the printed specific image, the relative position information including information indicating a positional deviation amount in the specific direction between the N1 first nozzles and the N2 second nozzles, and set, based on the relative position information, use nozzles to be used for printing and non-use nozzles not to be used for printing among the first nozzles and the second nozzles within the first overlapping range.

According to aspects of the present disclosure, there is further provided a non-transitory computer readable recording medium storing computer-readable instructions for a computer configured to control a print engine including a print head provided with a plurality of head unit including a first head unit provided with N1 first nozzles, N1 being an integer of 4 or more, located at positions different from each other in a specific direction and a second head unit provided with N2 second nozzles, N2 being an integer of 4 or more, located at positions different from each other in the specific direction. The first head unit and the second head unit are located at positions different from each other in an intersecting direction intersecting with the specific direction. A first range includes a first overlapping range and a first non-overlapping range. The first overlapping range overlaps with a second range in the specific direction. The first non-overlapping range does not overlap with the second range in the specific direction. The N1 first nozzles are located in the first range. The N2 second nozzles are located in the second range. The N1 first nozzles and the N2 second nozzles are nozzles that eject ink of the same color. The N1 first nozzles include two or more nozzle groups being at positions different from each other in the intersecting direction. The N2 second nozzles include two or more nozzle groups being at positions different from each other in the intersecting direction. The computer-readable instructions cause the computer to cause the print engine to print a specific image, the specific image including a first image to be printed using at least some of the N1 first nozzles and a second image to be printed using at least some of the N2 second nozzles, receive relative position information determined based on the printed specific image, the relative position information including information indicating a positional deviation amount in the specific direction between the N1 first nozzles and the N2 second nozzles, and set, based on the relative position information, use nozzles to be used for printing and non-use nozzles not to be used for printing among the first nozzles and the second nozzles within the first overlapping range.

According to aspects of the present disclosure, there is further provided a setting method for a print engine including a print head provided with a plurality of head unit including a first head unit provided with N1 first nozzles, N1 being an integer of 4 or more, located at positions different from each other in a specific direction and a second head unit provided with N2 second nozzles, N2 being an integer of 4 or more, located at positions different from each other in the specific direction. The first head unit and the second head unit are located at positions different from each other in an intersecting direction intersecting with the specific direction. A first range includes a first overlapping range and a first non-overlapping range. The first overlapping range overlaps with a second range in the specific direction. The first non-overlapping range does not overlap with the second range in the specific direction. The N1 first nozzles are located in the first range. The N2 second nozzles are located in the second range. The N1 first nozzles and the N2 second nozzles are nozzles that eject ink of the same color. The N1 first nozzles include two or more nozzle groups being at positions different from each other in the intersecting direction. The N2 second nozzles include two or more nozzle groups being at positions different from each other in the intersecting direction. The setting method includes causing the print engine to print a specific image, the specific image including a first image to be printed using at least some of the N1 first nozzles and a second image to be printed using at least some of the N2 second nozzles, receiving relative position information determined based on the printed specific image, the relative position information including information indicating a positional deviation amount in the specific direction between the N1 first nozzles and the N2 second nozzles, and setting, based on the relative position information, use nozzles to be used for printing and non-use nozzles not to be used for printing among the first nozzles and the second nozzles within the first overlapping range.

According to the above-described configurations, among the N1 first nozzles and the N2 second nozzles, the use nozzles to be used for printing and the non-use nozzles to be not used for printing are determined based on the relative position information determined based on the printed specific image. As a result, for example, even in a case where there is a positional deviation in a specific direction between the first head unit and the second head unit due to variations in mounting positions, it is possible to appropriately determine the use nozzles and the non-use nozzles from the N1 first nozzles and the N2 second nozzles that respectively include two or more nozzle groups that eject ink of the same color and have different positions in the intersecting direction. Therefore, for example, even in a case where there is a positional deviation in the specific direction between the first head unit and the second head unit, it is possible to suppress degradation in the image quality of the image printed by the print engine.

FIG. 4C is a list of candidate pairs for the boundary nozzle pair of the first and second head units.

FIG. 6C is a list of candidate pairs for the boundary nozzle pair of the second and third head units.

FIG. 11 is a second diagram showing another example of the test image.

A. FIRST EMBODIMENT

A-1. Configuration of Printing Apparatus

Figure 1:
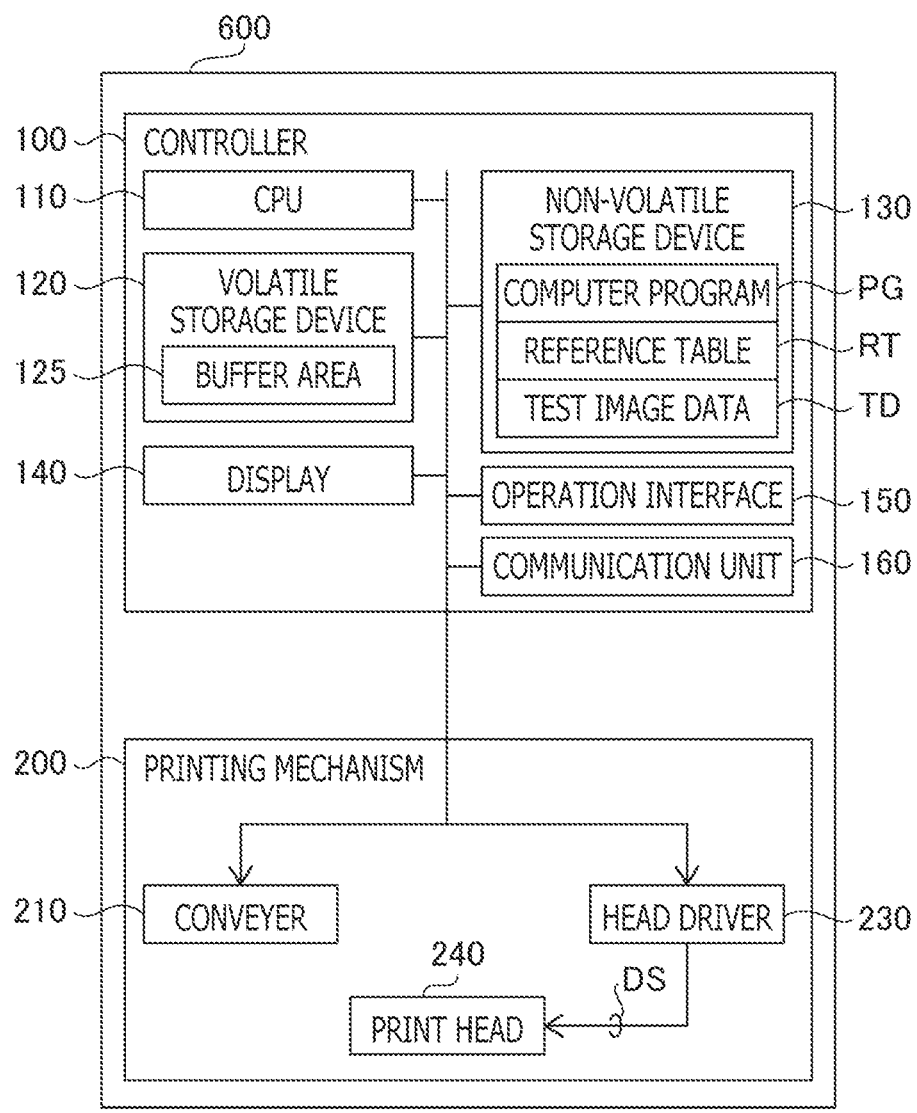
FIG. 1 is a block diagram showing a configuration of a printer.
Figure 2A:
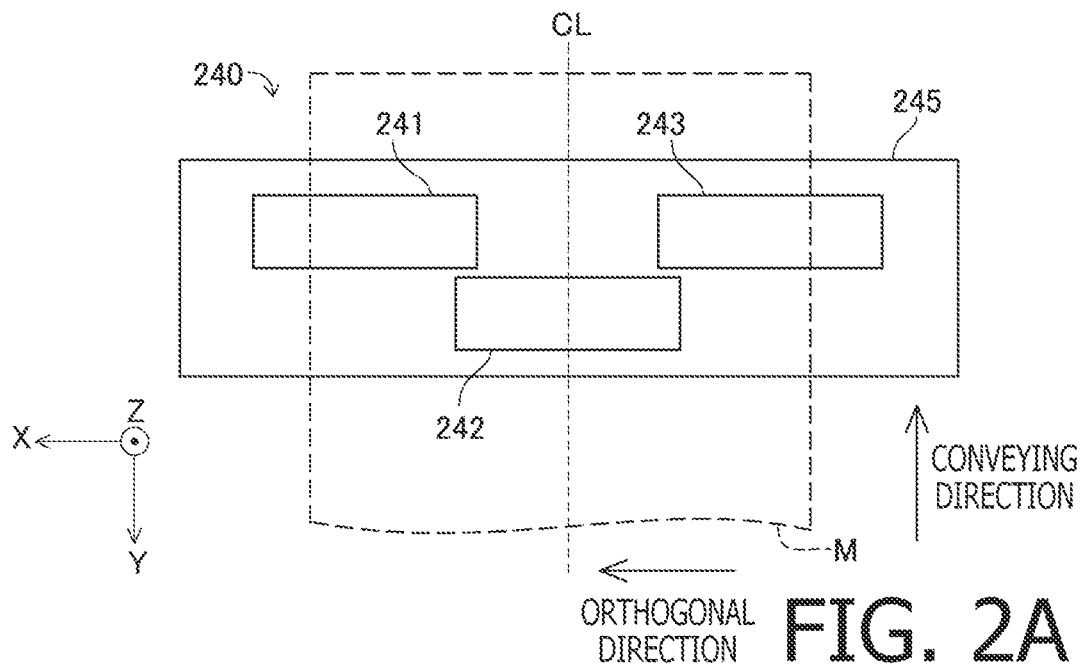
FIG. 2A is a diagram showing a schematic configuration of a print head.
Figure 2B:
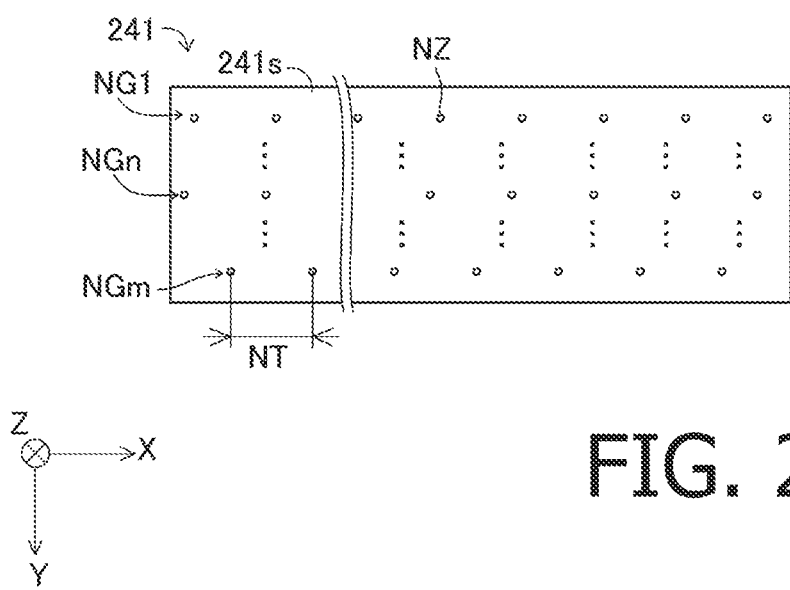
FIG. 2B is a schematic diagram showing a configuration of a first head unit.

Hereinafter, aspects of the present disclosure will be described based on an embodiment. FIG. 1 is a block diagram showing a configuration of a printer 600 of the embodiment. FIGS. 2A and 2B are diagrams showing a schematic configuration of a print head 240. The printer 600 includes a controller 100 configured to control the entire printer 600 and a printing mechanism 200 configured to execute printing.

The controller 100 includes a CPU 110, a volatile storage device 120 such as a DRAM, a non-volatile storage device 130 such as a flash memory or a hard disk drive, a display 140 such as a liquid crystal display, an operation interface 150 including a touch panel superimposed on the liquid crystal display and/or one or more buttons, and a communication unit 160 including a communication interface for communication with an external device such as a conventionally-known personal computer.

The volatile storage device 120 is provided with a buffer area 125 for temporarily storing various intermediate data generated when the CPU 110 performs processing. A computer program PG for controlling the printer 600, a reference table RT described later, and test image data TD are stored in the non-volatile storage device 130.

The computer program PG, the reference table RT, and the test image data TD are stored in advance in the non-volatile storage device 130 at the time of shipment of the printer 600. The computer program PG, the reference table RT, and the test image data TD may be provided in a form stored in a DVD-ROM or the like, or as data to be downloaded from a server. The CPU 110 executes the computer program PG to realize various processes such as control of the printer 600. The processes realized by executing the computer program PG includes a nozzle setting process which will be described later. The reference table RT is generated in a reference table generation process which will be described later. The reference table RT will be described later.

The printing mechanism 200 performs printing on a print medium by ejecting one type of ink (in the present embodiment, black ink which will hereinafter be referred to as "K ink") to form dots in accordance with the control by the CPU 110 of the controller 100.

The printing mechanism 200 includes a conveyer 210, a head driver 230, and a print head 240. The conveyer 210 includes a conventionally-known conveying motor, and conveys a sheet M serving as a print medium in a conveying direction by the power of the conveying motor. In the present embodiment, a roll sheet formed by winding a long label seal in a cylindrical shape is used as the sheet M. The printing medium is not limited to the roll sheet, and other sheets such as a roll sheet or cut sheet formed of standard paper may be used. FIG. 2A shows a center line CL passing through a center of the print head 240 in an X direction and being parallel to a Y direction. The conveyer 210 conveys the sheet M so that the center of the sheet M in the X direction coincides with the center of the print head 240 in the X direction (i.e., the center line CL).

The head driver 230 sends a drive signal DS to the print head 240 to drive the print head 240. The print head 240 ejects ink onto a sheet conveyed by the conveyer 210 in accordance with the drive signal DS to form dots. Unlike a so-called serial printer, the printing mechanism 200 is a line printer that performs printing without performing main scanning in which the print head 240 is moved in a direction intersecting the conveying direction.

As shown in FIG. 2A, the conveying direction of the sheet M conveyed by the conveyer 210 is defined as the Y direction, and a direction along the conveyed sheet M and intersecting with the conveying direction (in the present embodiment, a direction orthogonal to the conveying direction) is defined as the X direction. Since the printing mechanism 200 is a so-called line printer, the print head 240 includes a plurality of nozzle NZ arranged along the X direction. This will be described in detail below.

As shown in FIG. 2A, the print head 240 includes a base member 245, and first to third head units 241 to 243. The first to third head units 241 to 243 are attached to a particular position of the base member 245 by using a conventionally-known fixing means such as screws. FIG. 2B shows a configuration of the first head unit 241 as viewed from the a −Z side. As shown in FIG. 2B, m nozzle groups NGn (where m is an integer equal to or greater than 2, and n is an integer of 1 to m) for discharging the above-described K ink is formed on a nozzle forming surface 241s of the first head unit 241. One nozzle group NGn includes p nozzles NZ (where p is an integer equal to or greater than 2) arranged in a row at a particular nozzle pitch NT along the X direction. Positions of the m nozzle groups NGn in the X direction are shifted by (NT/m). Therefore, a total of (p×m) nozzles NZ of the m nozzle groups NGn are formed at different positions in the X direction. That is, the (p×m) nozzles NZ are formed at a nozzle pitch of (NT/m). Positions of the m nozzle groups NGn in the Y direction are different from each other, and are arranged in the Y direction at particular intervals. (NT/m) is, for example, a distance equivalent to 300 dpi or 600 dpi. The first head unit 241 has been described, but configurations of the second and third head units 242 and 243 are the same as that of the first head unit 241. For example, the number m of the nozzle groups NGn is 24, and the number p of the nozzles NZ included in one nozzle group NGn is 70.

The first to third head units 241 to 243 are at different positions in the X direction, and are arranged in the order from the first to third from the downstream side in the X direction. The first and third head units 241 and 243 are at the same position in the Y direction. The second head unit 242 and the first and third head units 241 and 243 are at different positions in the Y direction. A center of the second head unit 242 in the X direction coincides with a center of the print head 240 in the X direction and a center of the conveyed sheet M in the X direction (i.e., the center line CL). In the X direction, a portion of the second head unit 242 including a downstream end in the X direction overlaps with a portion of the first head unit 241 including an upstream end. In the X direction, a portion of the second head unit 242 including an upstream end in the X direction overlaps with a portion of the third head unit 243 including a downstream end (see FIG. 2A).

Figure 3A:
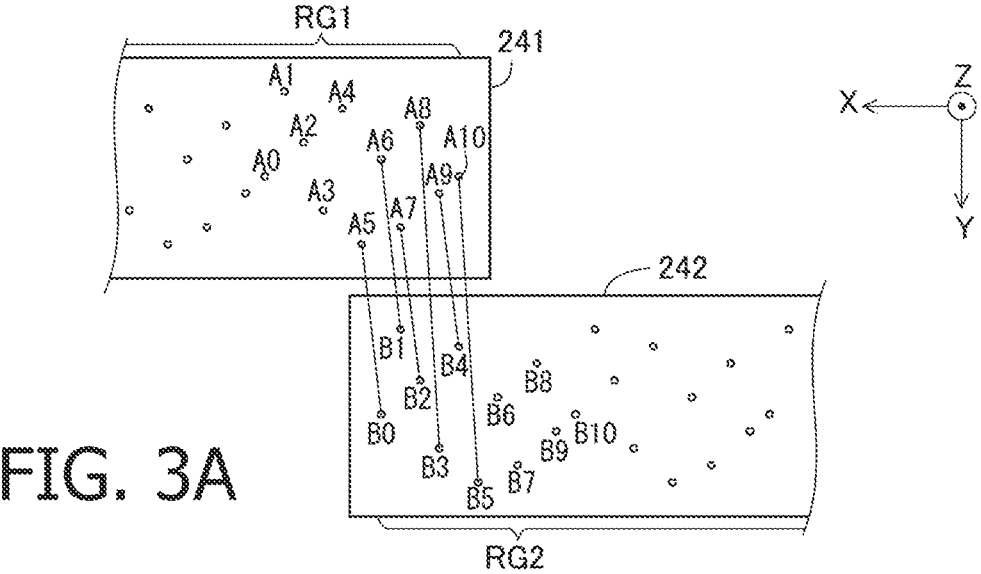
FIG. 3A is a schematic diagram of a vicinity of an upstream end of the first head unit in an X direction and a downstream end of a second head unit in the X direction.
Figure 3B:
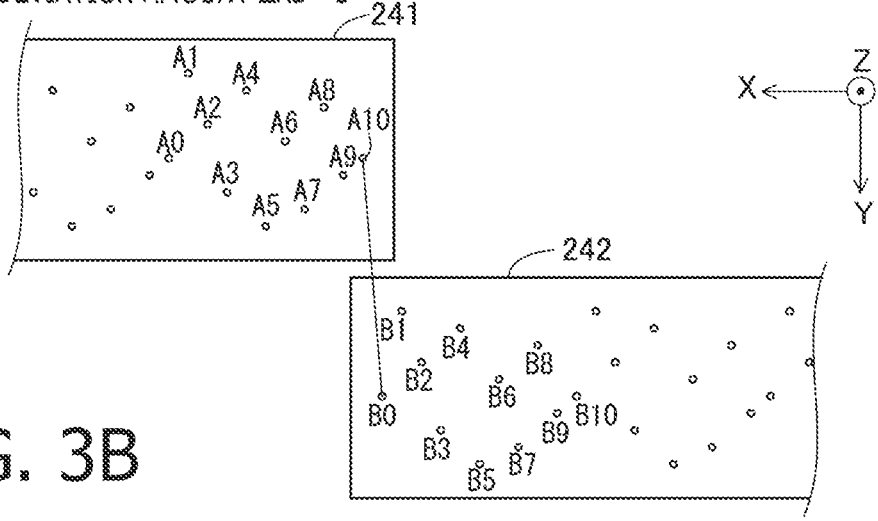
FIG. 3B is a schematic diagram of the vicinity of the upstream end of the first head unit in the X direction and the downstream end of the second head unit in the X direction.
Figure 3C:
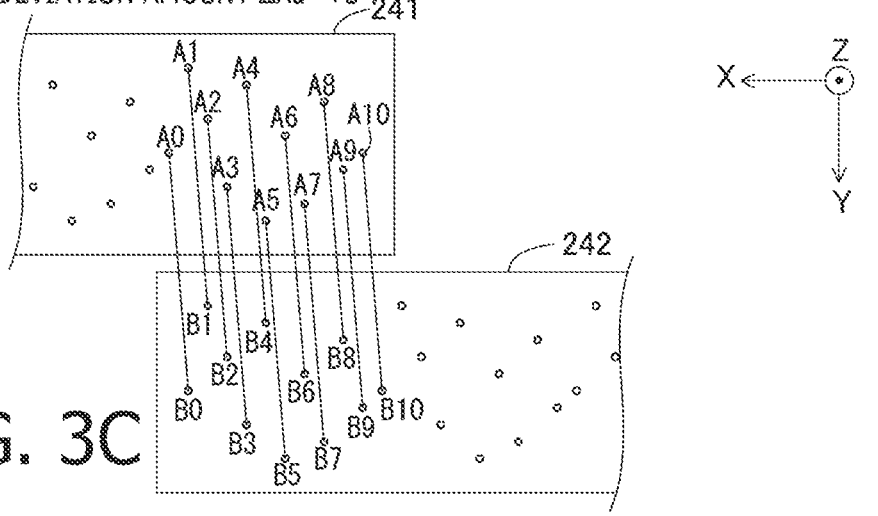
FIG. 3C is a schematic diagram of the vicinity of the upstream end of the first head unit in the X direction and the downstream end of the second head unit in the X direction.

FIGS. 3A to 3C are schematic diagrams of a vicinity of the upstream end of the first head unit 241 in the X direction and the downstream end of the second head unit 242 in the X direction. Points in the first and second head units 241 and 242 indicate positions of the nozzles NZ formed on the nozzle forming surface (−Z side surface) of the first and second head units 241 and 242. FIGS. 3A to 3C and FIGS. 5A to 5C which will be described later are shown while setting the number m of the nozzle groups NGn to a number smaller than the actual number (i.e., m=10) in order to simplify the drawing. Reference numbers in the vicinity of the points indicating the nozzles NZ (e.g., A0 to A10 and B0 to B10) are identifiers of the nozzles NZ. In the following description, the nozzle NZ with, for example, the identifier A1 is also referred to as a "nozzle A1".

Due to variations in mounting positions of the first to third head units 241 to 243 with respect to the base member 245, there are variations in relative positional relationships between the first to third head units 241 to 243 in the X direction. Due to these variations, relative positions of the plurality of nozzle NZ of the first head unit 241 with respect to the plurality of nozzle NZ of the second head unit 242 (hereinafter also referred to as "relative nozzle position") may deviate from designed positions. Hereinafter, an amount of positional deviation between the first head unit 241 and the second head unit 242 will be referred to as a positional deviation amount $\Delta Xa$, and an amount of positional deviation between the second head unit 242 and the third head unit 243 will be referred to as a positional deviation amount $\Delta Xb$. The positional deviation amount $\Delta Xa$ can be said to be information indicating the relative positions of the nozzles NZ of the first head unit 241 with respect to the nozzles NZ of the second head unit 242 in the X direction. Similarly, the positional deviation amount $\Delta Xb$ can be said to be information indicating the relative positions of the nozzles NZ of the second head unit 242 with respect to the nozzles NZ of the third head unit 243 in the X direction.

FIG. 3A shows a case where the positional deviation amount $\Delta Xa$ is 0, that is, a case where the relative nozzle position between the first head unit 241 and the second head unit 242 is as designed. A portion on the upstream side in the X direction of a range RG1 in the X direction in which the plurality of nozzle NZ of the first head unit 241 are located and a portion on the downstream side in the X direction of a range RG2 in the X direction in which the plurality of nozzle NZ of the second head unit 242 are located overlap with each other. In the example shown in FIG. 3A, a range within the range RG1 in which the nozzles A6 to A10 are located and a range within the range RG2 in which the nozzles B0 to B4 are located are overlapping ranges that overlap with each other. The range RG1 excluding the overlapping range is a range that does not overlap with the range RG2.

FIG. 3B shows a case where the positional deviation amount $\Delta Xa$ is −5. The negative value of the positional deviation amount $\Delta Xa$ means that the relative nozzle position between the first head unit 241 and the second head unit 242 is deviated from the designed position in a direction in which the overlapping range decreases. That is, the negative value of the positional deviation amount $\Delta Xa$ means that the second head unit 242 is deviated from its designed position with respect to the first head unit 241 toward the upstream side in the X direction (i.e., the right side in FIGS. 3A to 3C). A unit of the positional deviation amount $\Delta Xa$ is the number of nozzles. Therefore, in a case where the positional deviation amount $\Delta Xa$ is −5, the second head unit 242 is deviated from its designed position with respect to the first head unit 241 toward the upstream side in the X direction by 5 nozzles (i.e., 5×(NT/m)).

FIG. 3C shows a case where the positional deviation amount ΔXa is +5. The positive value of the positional deviation amount ΔXa means that the relative nozzle position between the first head unit 241 and the second head unit 242 is deviated from the designed position in a direction in which the overlapping range increases. That is, the positive value of the positional deviation amount ΔXa means that the second head unit 242 is deviated from its designed position with respect to the first head unit 241 toward the downstream side in the X direction (i.e., the left side in FIGS. 3A to 3C). Therefore, in a case where the positional deviation amount ΔXa is +5, the second head unit 242 is deviated from its designed position with respect to the first head unit 241 toward the downstream side in the X direction by five nozzles.

In a case where the positional deviation amount ΔXa is smaller than −5, for example, in a case where the positional deviation amount ΔXa is −6, a distance in the X-direction between the nozzle A10 at the upstream end in the X-direction of the first head unit 241 and the nozzle B0 at the downstream end in the X-direction of the second head unit 242 becomes excessively large. In this case, a gap is formed between an image printed by the first head unit 241 and the image printed by the second head unit 242. For this reason, tolerances of mounting positions of the first and second head units 241 and 242 are set so that the positional deviation amount ΔXa does not become smaller than −5. In the present embodiment, the tolerances of the mounting positions are determined so that the positional deviation amount ΔXa falls within the range of −5<ΔXa<+5.

Within the overlapping range, one of a pair of nozzles (e.g., nozzles A10 and B4 in FIG. 3A) being approximately at the same position in the X direction is used during printing, and the other is not used.

The nozzles to be used at the time of printing (hereinafter referred to as "use nozzles") are switched from the nozzles NZ of the first head unit 241 to the nozzles NZ of the second head unit 242 from a boundary at a particular position in the X direction within the overlapping range. For example, in the example shown in FIG. 3A, the nozzle A7 of the first head unit 241 and the nozzle B2 of the second head unit 242 may be set as a pair of nozzles that are at the boundary (hereinafter also referred to as a "boundary nozzle pair"). In this case, among the plurality of nozzle NZ of the first head unit 241, the nozzle A7 and the nozzles on the downstream side in the X direction (i.e., on the left side in FIGS. 3A to 3C) of the nozzle A7 are determined as the use nozzles, and the nozzles A8 to A10 on the upstream side in the X direction (i.e., on the right side in FIGS. 3A to 3C) of the nozzle A7 are determined as the nozzles not to be used (hereinafter referred to as "non-use nozzles"). Among the plurality of nozzle NZ of the second head unit 242, the nozzle B2 and the nozzles NZ on the upstream side in the X direction (i.e., on the right side in FIGS. 3A to 3C) of the nozzle B2 are determined as the use nozzles, and the nozzles B0 and B1 on the downstream side in the X-direction (i.e., on the left side in FIGS. 3A to 3C) of the nozzle B2 are determined as the non-use nozzles.

In FIGS. 3A to 3C, pairs of nozzles NZ respectively connected by solid lines indicate pairs that may become the boundary nozzle pair (i.e., candidate pairs for the boundary nozzle pair). The nozzles NZ of the second head unit 242 constituting the boundary nozzle pair are located upstream of the nozzles NZ of the first head unit 241 constituting the boundary nozzle pair by one nozzle, that is, by (NT/m) in the X direction.

The number of candidate pairs varies depending on the positional deviation amount ΔXa. For example, in a case where the positional deviation amount ΔXa is 0, there are six candidate pairs (see FIG. 3A). In a case where the positional deviation amount ΔXa is −5, there is only one candidate pair (see FIG. 3B). In a case where the positional deviation amount ΔXa is +5, there are eleven candidate pairs (see FIG. 3C).

Figure 4A:
FIG. 4A is a list of candidate pairs for a boundary nozzle pair of the first and second head units.
Figure 4B:
FIG. 4B is a list of candidate pairs for the boundary nozzle pair of the first and second head units.

FIGS. 4A to 4C are tables of the candidate pairs in the first and second head units 241 and 242. FIG. 4A is a table showing six candidate pairs in a case where the positional deviation amount ΔXa is 0. The six candidate pairs are a pair of nozzles A5 and B0, a pair of nozzles A6 and B1, a pair of nozzles A7 and B2, a pair of nozzles A8 and B3, a pair of nozzles A9 and B4, and a pair of nozzles A10 and B5.

FIG. 4B is a table showing one candidate pair in a case where the positional deviation amount ΔXa is −5. The one candidate pair is a pair of nozzles A10 and B0.

FIG. 4C is a table showing eleven candidate pairs in a case where the positional deviation amount ΔXa is +5. The eleven candidate pairs are a pair of nozzles A0 and B0, a pair of nozzles A1 and B1, a pair of nozzles A2 and B2, a pair of nozzles A3 and B3, a pair of nozzles A4 and B4, a pair of nozzles A5 and B5, a pair of nozzles A6 and B6, a pair of nozzles A7 and B7, a pair of nozzles A8 and B8, a pair of nozzles A9 and B9, and a pair of nozzles A10 and B10.

Figure 5A:
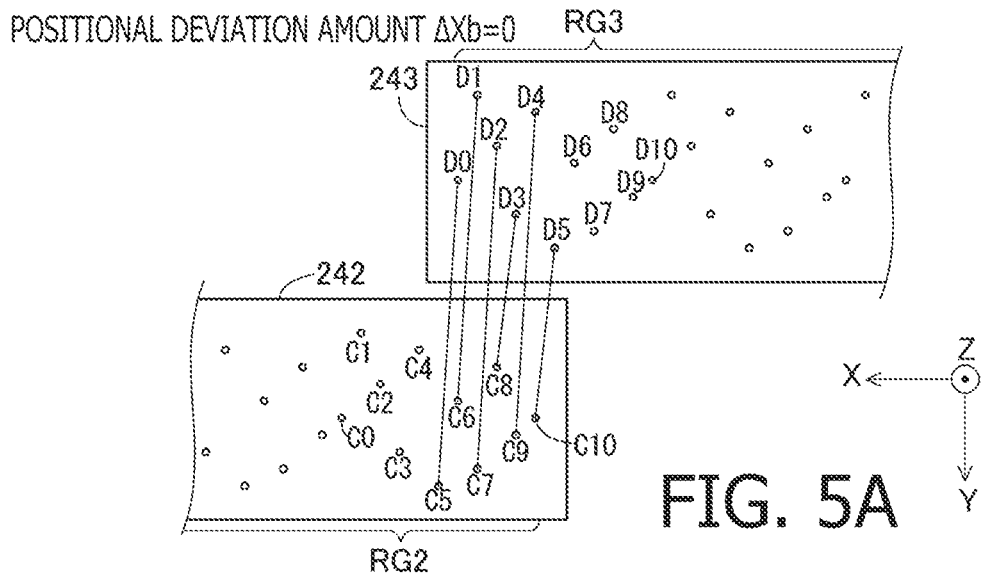
FIG. 5A is a schematic diagram of a vicinity of an upstream end of the second head unit in the X direction and a downstream end of a third head unit in the X direction.
Figure 5B:
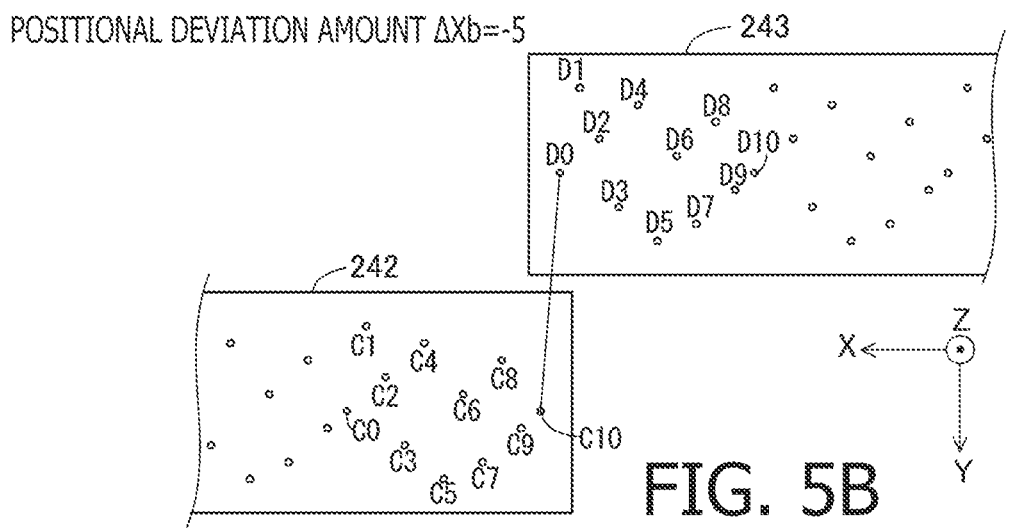
FIG. 5B is a schematic diagram of the vicinity of the upstream end of the second head unit in the X direction and the downstream end of the third head unit in the X direction.
Figure 5C:
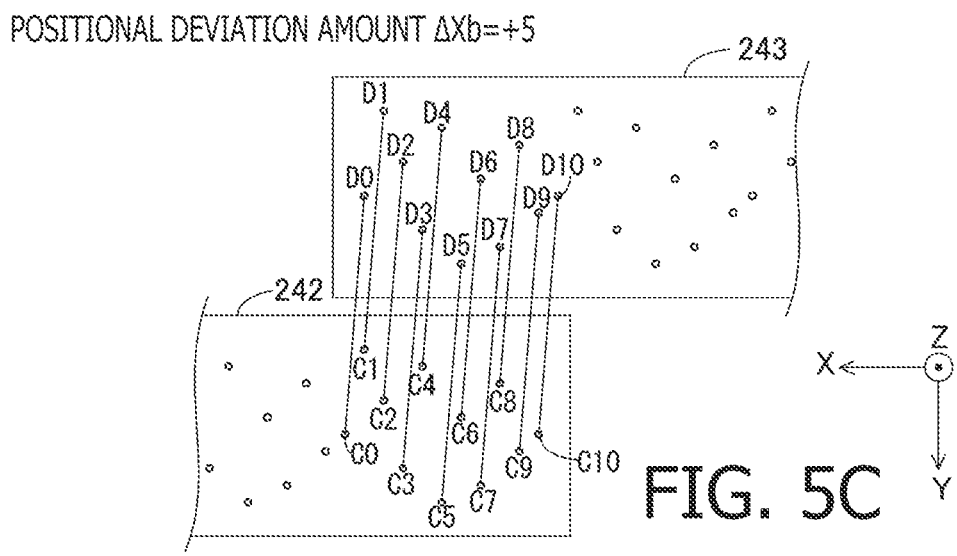
FIG. 5C is a schematic diagram of the vicinity of the upstream end of the second head unit in the X direction and the downstream end of the third head unit in the X direction.

FIGS. 5A to 5C are schematic diagrams of a vicinity of the upstream end of the second head unit 242 in the X direction and the downstream end of the third head unit 243 in the X direction. As with FIGS. 3A to 3C, points in the second and third head units 242 and 243 indicate positions of the nozzles NZ formed on the nozzle forming surface (−Z side surface) of the second and third head units 242 and 243. Reference numbers in the vicinity of the points indicating the nozzles NZ (e.g., C0 to C10 and D0 to D10) are identifiers of the nozzles NZ.

FIG. 5A shows a case where the positional deviation amount ΔXb is 0, that is, a case where the relative nozzle position between the second head unit 242 and the third head unit 243 is as designed. A portion on the upstream side in the X direction of the range RG2 in the X direction in which the plurality of nozzle NZ of the second head unit 242 are located and a portion on the downstream side in the X direction of a range RG3 in the X direction in which the plurality of nozzle NZ of the third head unit 243 are located overlap with each other. In the example shown in FIG. 5A, a range within the range RG2 in which the nozzles C6 to C10 are located and a range within the range RG3 in which the nozzles D0 to D4 are located are overlapping ranges that overlap with each other.

As can be understood from FIGS. 3A to 3C and FIGS. 5A to 5C, the range RG2 in which the nozzles NZ of the second head unit 242 is located is located between the range within the range RG1 that does not overlap with the range RG2 and the range within the range RG3 that does not overlap with the range RG2.

FIG. 5B shows a case where the positional deviation amount ΔXb is −5, and FIG. 5C shows a case where the positional deviation amount ΔXb is +5. As with the positional deviation amount ΔXa, the negative value of the positional deviation amount ΔXb means that the relative nozzle position between the second head unit 242 and the third head unit 243 is deviated from the designed position in a direction in which the overlapping range decreases. Similarly, the positive value of the positional deviation amount ΔXb means that the relative nozzle position between the second head unit 242 and the third head unit 243 is deviated from the designed position in a direction in which the overlapping range increases. As with the positional deviation amount ΔXa, the unit of the positional deviation amount ΔXb is the number of nozzles.

In a case where the positional deviation amount ΔXb is smaller than −5, a gap is formed between an image printed by the second head unit 242 and an image printed by the third head unit 243. For this reason, tolerances of mounting positions of the second and third head units 242 and 243 are determined to be within the range of −5<ΔXb<+5 so that the positional deviation amount ΔXb does not become smaller than −5.

As with the overlapping range of the first and second head units 241 and 242 described above, the use nozzles within the overlapping range of the second and third head units 242 and 243 are determined based on the boundary nozzle pair. For example, in the example shown in FIG. 5A, the nozzle C8 of the second head unit 242 and the nozzle D3 of the third head unit 243 may be set as the boundary nozzle pair. In this case, among the plurality of nozzle NZ of the second head unit 242, the nozzle C8 and the nozzles NZ downstream of the nozzles C8 in the X direction are determined as the use nozzles, and the nozzles C9 and C10 upstream of the nozzle C8 in the X direction are determined as the non-use nozzles. Among the plurality of nozzle NZ of the third head unit 243, the nozzle D3 and the nozzles NZ upstream of the nozzle D3 in the X direction are determined as the use nozzles, and the nozzles D0 to D2 downstream of the nozzle D3 in the X direction are determined as the non-use nozzles.

In FIGS. 5A to 5C, pairs of nozzles NZ respectively connected by solid lines indicate candidate pairs. The nozzle NZ of the third head unit 243 constituting each boundary nozzle pair is located upstream of the nozzle NZ of the second head unit 242 constituting the boundary nozzle pair by one nozzle in the X direction.

Figure 6A:
FIG. 6A is a list of candidate pairs for the boundary nozzle pair of the second and third head units.
Figure 6B:
FIG. 6B is a list of candidate pairs for the boundary nozzle pair of the second and third head units.

FIGS. 6A to 6C are tables of candidate pairs of the second and third head units 242 and 243. FIG. 6A is a table showing six candidate pairs in a case where the positional deviation amount ΔXb is 0. The six candidate pairs are a pair of nozzles C5 and D0, a pair of nozzles C6 and D1, a pair of nozzles C7 and D2, a pair of nozzles C8 and D3, a pair of nozzles C9 and D4, and a pair of nozzles C10 and D5.

FIG. 6B is a table showing one candidate pair in a case where the positional deviation amount ΔXb is −5. The one candidate pair is a pair of nozzles C10 and D0.

FIG. 6C is a table showing eleven candidate pairs in a case where the positional deviation amount ΔXb is +5. The eleven candidate pairs are a pair of nozzles C0 and D0, a pair of nozzles C1 and D1, a pair of nozzles C2 and D2, a pair of nozzles C3 and D3, a pair of nozzles C4 and D4, a pair of nozzles C5 and D5, a pair of nozzles C6 and D6, a pair of nozzles C7 and D7, a pair of nozzles C8 and D8, a pair of nozzles C9 and D9, and a pair of nozzles C10 and D10.

A-2. Generation of Reference Table RT

The reference table RT is a table in which boundary nozzle pairs for the positional deviation amounts ΔXa and ΔXb are respectively recorded. Hereinafter, a flow of processes for generating the reference table RT will be described.

Figure 7:
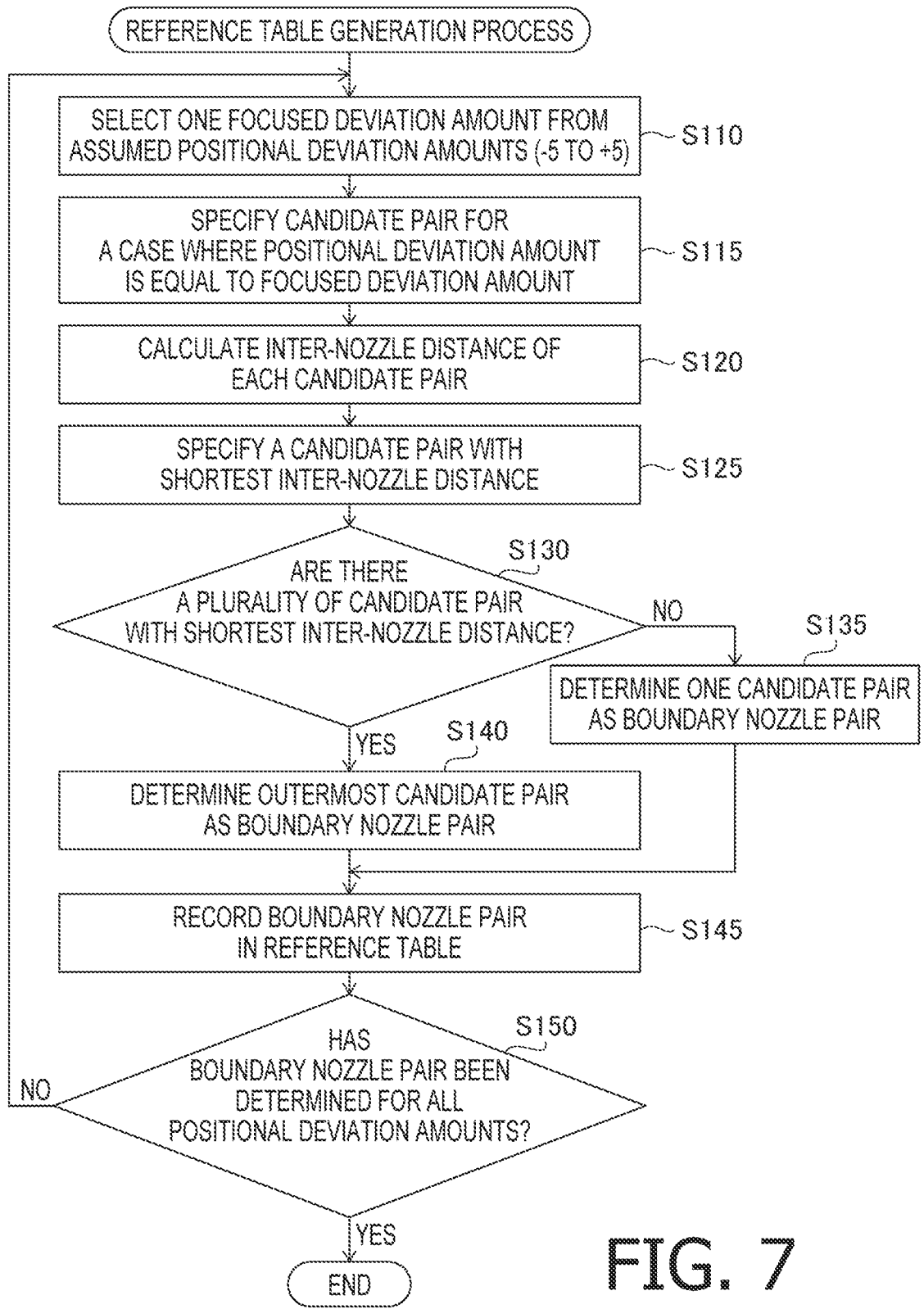
FIG. 7 is a flowchart of processes for generating a reference table.
Figure 8A:
FIG. 8A is a diagram showing an example of the reference table.
Figures 8B, 9:
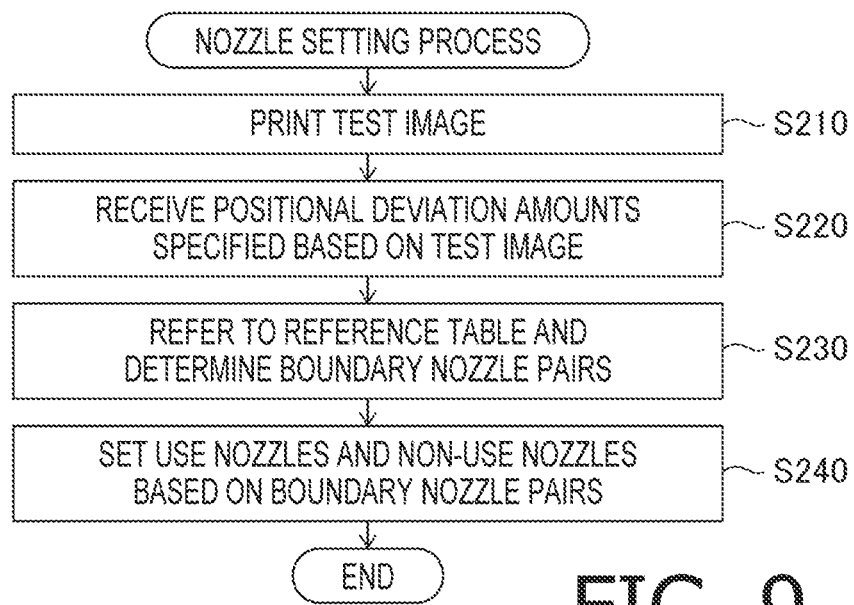
FIG. 8B is a diagram showing an example of the reference table.
FIG. 9 is a flowchart of a nozzle setting process.

FIG. 7 is a flowchart of processes for generating the reference table RT. FIGS. 8A and 8B are diagrams showing an example of the reference table RT. As shown in FIGS. 8A and 8B, the reference table RT includes a first table RTa and a second table RTb. The first table RTa is a table in which the boundary nozzle pair between the first and second head units 241 and 242 are recorded, and the second table RTb is a table in which the boundary nozzle pair between the second and third head units 242 and 243 are recorded. The processes shown in FIG. 7 are executed for each of the first table RTa and the second table RTb. Hereinafter, the processes shown in FIG. 7 will be described by taking the case for generating the first table RTa as an example.

The processes shown in FIG. 7 are performed, for example, by a manufacturer of the printer 600. In S110, an operator selects one deviation amount (hereinafter referred to as "focused deviation amount") from assumed positional deviation amounts ΔXa. Specifically, one focused deviation amount is sequentially selected from eleven positional deviation amounts ΔXa including −5, −4, −3, −2, −1, 0, +1, +2, +3, +4, and +5.

In S115, the operator specifies the candidate pair for a case where the positional deviation amount is equal to the focused deviation amount. For example, when the focused deviation amount is 0, six nozzle pairs shown in the table of FIG. 4A are specified as the candidate pairs. When the focused deviation amount is −5, one nozzle pair shown in the table of FIG. 4B is specified as the candidate pair. When the focused deviation amount is +5, eleven nozzle pairs shown in the table of FIG. 4C are specified as the candidate pairs.

In S120, the operator calculates an inter-nozzle distance of each candidate pair. The inter-nozzle distance of the candidate pair described herein is a distance in the conveying direction (i.e., Y direction) between one nozzle NZ and the other nozzle NZ constituting the candidate pair. In the present embodiment, coordinates in the engineering drawings are used to calculate the inter-nozzle distance of the candidate pair. In the tables of FIGS. 4A to 4C and 6A to 6C, the inter-nozzle distance of the candidate pair is shown for each of the candidate pairs. For example, in a case where the focused deviation amount is 0, the inter-nozzle distances (i.e., 20 mm, 20 mm, 18 mm, 38 mm, 18 mm, 36 mm) of the six candidate pairs shown in the table of FIG. 4A (i.e., the pair of nozzles A5 and B0, the pair of nozzles A6 and B1, the pair of nozzles A7 and B2, the pair of nozzles A8 and B3, the pair of nozzles A9 and B4, and the pair of nozzles A10 and B5) are respectively calculated. In a case where the focused deviation amount is +5, the inter-nozzle distance (i.e., 28 mm) of each of the eleven candidate pairs shown in the table of FIG. 4C are calculated.

In S125, the operator specifies, from among the candidate pairs, a candidate pair with the shortest inter-nozzle distance. For example, in a case where the focused deviation amount is 0, since the shortest inter-nozzle distance is 18 mm, two candidate pairs (i.e., a pair of nozzles A7 and B2 and a pair of nozzles A9 and B4) with the inter-nozzle distance of 18 mm are specified. In a case where the focused deviation amount is +5, since the shortest inter-nozzle distance is 28 mm, eleven candidate pairs (i.e., all the candidate pairs listed in FIG. 4C) with the inter-nozzle distance of 28 mm are specified. As described above, the number of candidate pairs specified in this step may be one or plural.

In S130, the operator determines whether there are a plurality of candidate pair with the shortest inter-nozzle distance. If there is only one candidate pair with the shortest inter-nozzle distance (S130: NO), in S135, the operator determines the one nozzle pair as the boundary nozzle pair.

If there are a plurality of candidate pair with the shortest inter-nozzle distance (S130: YES), in S140, the operator determines an outermost candidate pair among the plurality of candidate pair with the shortest inter-nozzle distance as the boundary nozzle pair. For example, in a case where the positional deviation amount ΔXa between the first and second head units 241 and 242 is the focused deviation amount, a candidate pair located most downstream in the X-direction (i.e., on the left side in FIGS. 3A to 3C) is determined as the boundary nozzle pair. For example, in a case where the focused deviation amount is +5, the pair of nozzles A7 and B2 located most downstream in the X-direction among the eleven candidate pairs with the inter-nozzle distance of 28 mm is determined as the boundary nozzle pair (see FIG. 3C). For example, in a case where the focused deviation amount is 0, the pair of nozzles A7 and B2 located most downstream in the X direction among the two candidate pairs with the inter-nozzle distance of 18 mm is determined as the boundary nozzle pair (see FIG. 3A). It should be noted that, in a case where the positional deviation amount ΔXb between the second and third head units 242 and 243 is the focused deviation amount, a candidate pair located most upstream in the X direction (i.e., on the right side in FIGS. 5A to 5C) is determined as the boundary nozzle pair. The outermost candidate pair is determined as the boundary nozzle pair in order to widen a range in the X direction that can be printed only by the nozzles NZ of the second head unit 242 located at the center in the X direction. The reason will be described later.

In a case where the focused deviation amount is −5, since there is only one candidate pair, the one candidate pair (i.e., the pair of nozzles A10 and B0) is determined as the boundary nozzle pair (see FIG. 3B).

In S145, the operator records the boundary nozzle pair determined in S135 or S140 in the first table RTa in association with the focused deviation amount (see FIG. 8A).

In S150, the operator determines whether or not the boundary nozzle pair has been determined for all the positional deviation amounts described above. If the boundary nozzle pair has not been determined for some of the positional deviation amounts (S150: NO), the operator returns to S110 and selects a new focused deviation amount. If the boundary nozzle pair has been determined for all the positional deviation amounts (S150: YES), the operator terminates the generation of the reference table.

Generation of the first table RTa concerning the boundary nozzle pair between the first and second head units 241 and 242 (see FIGS. 3A to 3C and 4A to 4C) has been described as an example. Generation of the second table RTb concerning the boundary nozzle pair between the second and third head units 242 and 243 (see FIGS. 5A to 5C and 6A to 6C) is also performed in the same manner. For example, for the second and third head units 242 and 243, the boundary nozzle pair in a case where the positional deviation amount ΔXb is 0 is determined as the pair of nozzles C8 and D3, the boundary nozzle pair in a case where the positional deviation amount ΔXb is −5 is determined as the pair of nozzles C10 and D0, and the boundary nozzle pair in a case where the positional deviation amount ΔXb is +5 is determined as the pair of nozzles C10 and D10. The reference table RT thus generated is stored, for example, in the non-volatile storage device 130 when manufacturing the printer 600.

A-3. Nozzle Setting Process

Hereinafter, the nozzle setting process realized by the CPU 110 of the printer 600 will be described. The nozzle setting process is executed based on an operator's instruction, for example, at the first startup after the manufacturing of the printer 600 or when a defect such as a streak appears in a printed image. The nozzle setting process may be executed in the manufacturing process of the printer 600.

Figure 10:
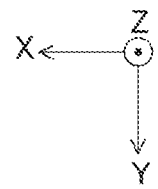
FIG. 10 is a first diagram showing an example of a test image.
Figure 11:
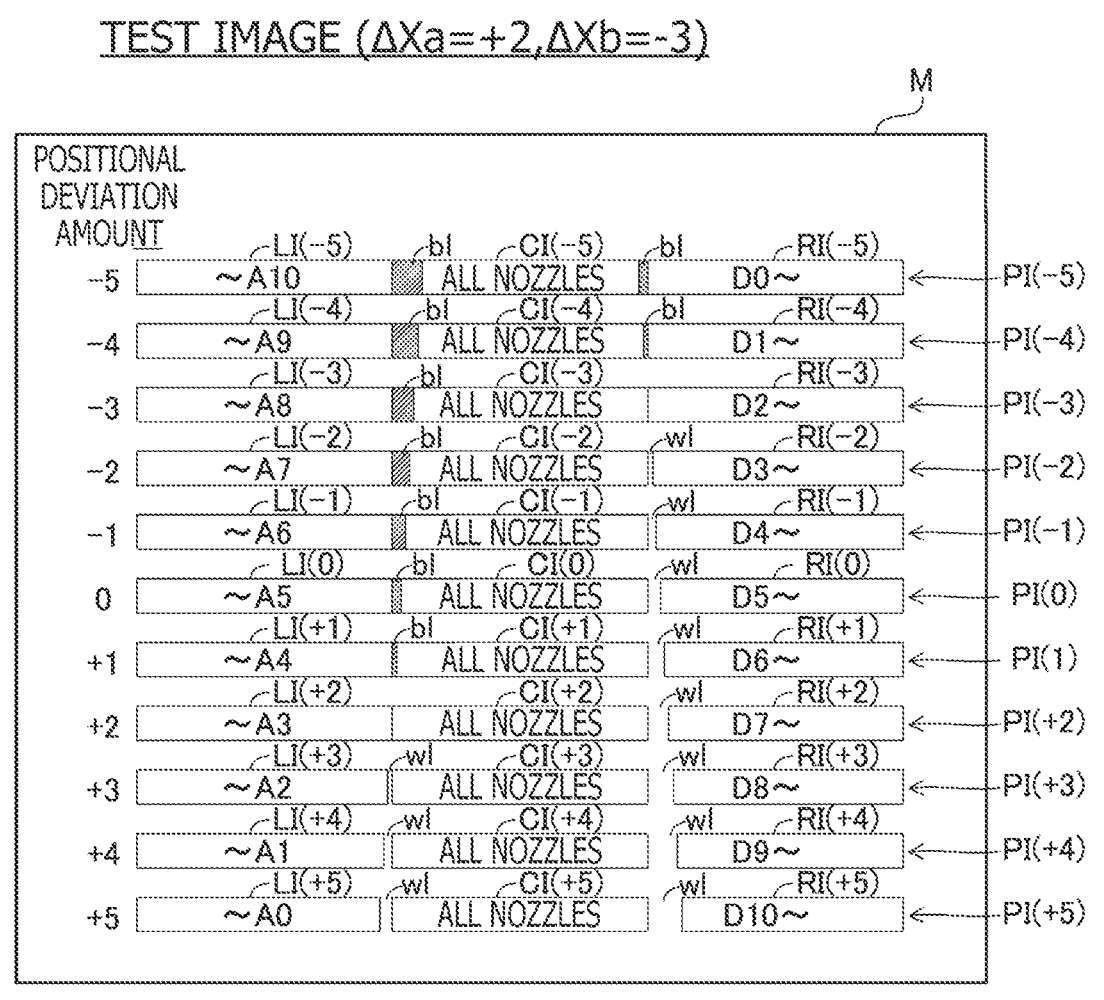

In S210, the CPU 110 supplies test image data TD to the printing mechanism 200, to cause the printing mechanism 200 to print a test image TI on the sheet M. FIGS. 10 and 11 are examples of the test image TI.

The test image TI includes eleven belt-like images PI(q) corresponding one to one with the above-described eleven positional deviation amounts ΔXa or ΔXb, namely −5, −4, −3, −2, −1, 0, +1, +2, +3, +4, and +5. The numeral q in the parenthesis of the symbol for the belt-like image indicates the corresponding positional deviation amount, and takes any value of an integer between −5 and +5.

The belt-like image PI(q) includes a left image LI(q), a center image CI(q), and a right image RI(q). The left image LI(q) is printed using the nozzles NZ of the first head unit 241. The center image CI(q) is printed using the nozzles NZ of the second head unit 242. The right image RI(q) is printed using the nozzles NZ of the third head unit 243.

The left image LI(q) is printed using the nozzles NZ corresponding to the corresponding positional deviation amount (i.e., the value of q). For example, the left image LI(−5) is printed using, among the nozzles NZ of the first head unit 241, nozzles from a specific nozzle near the downstream end in the X direction to the nozzle A10 (see FIG. 3A, etc.). The left images LI(−4), LI(−3), LI(−2), LI(−1), and LI(0) are printed using nozzles from the specific nozzle to the nozzle A9, nozzles from the specific nozzle to the nozzle A8, nozzles from the specific nozzle to the nozzle A7, nozzles from the specific nozzle to the nozzle A6, and nozzles from the specific nozzle to the nozzle A5, respectively. The left images LI(+1), LI(+2), LI(+3), LI(+4), and LI(+5) are printed using nozzles from the specific nozzle to the nozzle A4, nozzles from the specific nozzle to the nozzle A3, nozzles from the specific nozzle to the nozzle A2, nozzles from the specific nozzle to the nozzle A1, and nozzles from the specific nozzle to the nozzle A0, respectively. As described above, the nozzles for printing the left image LI (q) decrease by one from the upstream side in the X direction (i.e., the right side in FIG. 10) as the corresponding positional deviation amount (i.e., the value of q) increases by one. Therefore, a position of an upstream end in the X direction of the left image LI(q) (i.e., the right end in FIG. 10) shifts by one nozzle to the downstream side in the X direction (i.e., to the left side in FIG. 10) as the corresponding positional deviation amount (i.e., the value of q) increases by one.

The center image CI(q) is printed using all the nozzles NZ of the second head unit 242 regardless of the corresponding positional deviation amount (i.e., the value of q). Therefore, the center image CI(q) is the same regardless of the corresponding positional deviation amount (i.e., the value of q).

The right image RI(q) is printed using the nozzles NZ corresponding to the corresponding positional deviation amount (i.e., the value of q). For example, the right image RI(−5) is printed using, among the nozzles NZ of the third head unit 243, nozzles from the nozzle D0 (see FIG. 5A. etc.) to a specific nozzle near the upstream end in the X direction. The right images RI(−4), RI(−3), RI(−2), RI(−1), and RI(0) are printed using nozzles from the nozzle D1 to the specific nozzle, nozzles from the nozzle D2 to the specific nozzle, nozzles from the nozzle D3 to the specific nozzle, nozzles from the nozzle D4 to the specific nozzle, and nozzles from the nozzle D5 to the specific nozzle, respectively. The right images RI(+1), RI(+2), RI(+3), RI(+4), and RI(+5) are printed using nozzles from the nozzle D6 to the specific nozzle, nozzles from the nozzle D7 to the specific nozzle, nozzles from the nozzle D8 to the specific nozzle, nozzles from the nozzle D9 to the specific nozzle, and nozzles from the nozzle D10 to the specific nozzle, respectively. As described above, the nozzles for printing the right image RI(q) decrease by one from the downstream side in the X direction (i.e., the left side in FIG. 10) as the corresponding positional deviation amount (i.e., the value of q) increases by one. Therefore, a position of a downstream end in the X direction of the right image RI(q) (i.e., the right end in FIG. 10) shifts by one nozzle to the upstream side in the X-direction (i.e., to the right side in FIG. 10) as the corresponding positional deviation amount (i.e., the value of q) increases by one.

As a result of configuring the test image TI as described above, in a case where the positional deviation amount ΔXa is 0 (see FIG. 10), neither a white stripe wl nor a black stripe bl is generated between the left image LI(0) and the center image CI(0) of the belt-like image PI(0) corresponding to the positional deviation amount "0." The black stripe bl is generated between the left image LI(q) and the center image CI(q) of the belt-like image PI(q) corresponding to the positional deviation amounts smaller than 0 (i.e., q=−5 to −1). The black stripe bl is generated as an upstream end in the X-direction of the left image LI(q) and a downstream end in the X-direction of the center image CI(q) overlap with each other. The white stripe wl is generated between the left image LI(q) and the center image CI(q) of the belt-like image PI(q) corresponding to the positional deviation amount larger than 0 (i.e., q=+1 to +5). The white stripe wl is generated by a gap between the upstream end in the X-direction of the left image LI(q) and the downstream end in the X-direction of the center image CI(q). In FIGS. 10 and 11, the black stripes bl and the white stripes wl are shown thick in order to make the drawing easy to see, but actually they are thin stripes of about five nozzles (i.e., 5×(NT/m)) at most.

Similarly, in a case where the positional deviation amount ΔXb is 0 (see FIG. 10), neither the white stripe wl nor the black stripe bl is generated between the right image RI(0) and the center image CI(0) of the belt-like image PI(0) corresponding to the positional deviation amount "0." The black stripe bl is generated between the right image RI(q) and the center image CI(q) of the belt-like image PI(q) corresponding to the positional deviation amount smaller than 0(i.e., q=−5 to −1). The white stripe wl is generated between the right image RI(q) and the center image CI(q) of the belt-like image PI(q) corresponding to the positional deviation amount larger than 0 (i.e., q=+1 to +5).

In a case where the positional deviation amount ΔXa is +2 (see FIG. 11), neither the white stripe wl nor the black stripe bl is generated between the left image LI(+2) and the center image CI(+2) of the belt-like image PI(+2) corresponding to the positional deviation amount "+2." The black stripe bl is generated between the left image LI(q) and the center image CI(q) of the belt-like image PI(q) corresponding to the positional deviation amount smaller than +2 (i.e., q=−5 to +1). The white stripe wl is generated between the left image LI(q) and the center image CI(q) of the belt-like image PI(q) corresponding to the positional deviation amount larger than +2 (i.e., q=+3 to +5).

In a case where the positional deviation amount ΔXb is −3 (see FIG. 11), neither the white stripe wl nor the black stripe bl is generated between the right image RI(−3) and the center image CI(−3) of the belt-like image PI(−3) corresponding to the positional deviation amount "−3." The black stripe bl is generated between the right image RI(q) and the center image CI(q) of the belt-like image PI(q) corresponding to the positional deviation amount smaller than −3 (i.e., q=−5 to −4). The white stripe wl is generated between the right image RI(q) and the center image CI(q) of the belt-like image PI(q) corresponding to the positional deviation amount larger than −3 (i.e., q=−2 to +5).

As described above, by observing the printed test image TI, an operator can specify the positional deviation amounts ΔXa and ΔXb occurring in the print head 240.

In S220 of FIG. 9, the CPU 110 receives the positional deviation amounts ΔXa and ΔXb specified based on the test image TI. For example, the operator identifies the positional deviation amounts ΔXa and ΔXb by observing the test image TI and checking the white stripe(s) wl and/or the black stripe(s) bl of each belt-shaped image PI(q). The CPU 110 displays an operator interface screen for inputting the positional deviation amounts ΔXa and ΔXb on the display 140. The operator inputs the specified positional deviation amounts ΔXa and ΔXb on the operator interface screen by using the operation interface 150. The CPU 110 receives the positional deviation amounts ΔXa and ΔXb input through the operator interface screen.

In a modified example, the CPU 110 may acquire scan data generated by reading the printed test image TI with a scanner and analyze the scan data to check the occurrence of the white stripe(s) wl and/or the black stripe(s) bl in each belt-like image PI(q). In this case, the CPU 110 acquires the positional deviation amounts ΔXa and ΔXb based on the check result.

In S230, the CPU 110 refers to the reference table RT to determine the boundary nozzle pair. Specifically, the CPU 110 refers to the first table RTa to determine the boundary nozzle pair associated with the positional deviation amount ΔXa as the boundary nozzle pair between the first and second head units 241 and 242 (also referred to as a "left-side boundary nozzle pair"). The CPU 110 refers to the second table RTb to determine the boundary nozzle pair associated with the positional deviation amount ΔXb as the boundary nozzle pair between the second and third head units 242 and 243 (also referred to as a "right-side boundary nozzle pair"). For example, in a case where the positional deviation amounts ΔXa and ΔXb are −3 and +2, the pair of nozzles A9 and B1 is determined as the left-side boundary nozzle pair, and the pair of nozzles C8 and D5 is determined as the right-side boundary nozzle pair.

In S240, the CPU 110 sets the use nozzles and the non-use nozzles of the first to third head units 241 to 243 based on the boundary nozzle pairs.

Specifically, the CPU 110 determines, from among the plurality of nozzle NZ of the first head unit 241, nozzles NZ from a nozzle NZ at the downstream end in the X direction to a nozzle NZ of the first head unit 241 constituting the left-side boundary nozzle pair as the use nozzles. The CPU 110 determines, from among the plurality of nozzle NZ of the first head unit 241, nozzles NZ upstream in the X direction of the nozzle NZ of the first head unit 241 constituting the left-side boundary nozzle pair as the non-use nozzles.

The CPU 110 determines, from among the plurality of nozzle NZ of the second head unit 242, nozzles NZ from a nozzle NZ of the second head unit 242 constituting the left-side boundary nozzle pair to a nozzle NZ of the second head unit 242 constituting the right-side boundary nozzle pair as the use nozzles. The CPU 110 determines, from among the plurality of nozzle NZ of the second head unit 242, nozzles NZ downstream in the X direction of the nozzle NZ of the second head unit 242 constituting the left-side boundary nozzle pair and nozzles NZ upstream in the X direction of the nozzle NZ of the second head unit 242 constituting the right-side boundary nozzle pair as the non-use nozzles.

The CPU 110 determines, from among the plurality of nozzle NZ of the third head unit 243, nozzles NZ from a nozzle NZ of the third head unit 243 constituting the right-side boundary nozzle pair to a nozzle NZ at the upstream end in the X direction as the use nozzles. The CPU 110 determines, from among the plurality of nozzle NZ of the third head unit 243, nozzles NZ downstream in the X direction of the nozzle NZ of the third head unit 243 constituting the right-side boundary nozzle pair as the non-use nozzles.

For example, in a case where the positional deviation amount ΔXa is −3, a plurality of nozzle NZ of the first head unit 241 from the nozzle NZ at the downstream end in the X direction to the nozzle A9 are determined as the use nozzles of the first head unit 241, and the nozzle A10 is determined as the non-use nozzle of the first head unit 241. In a case where the positional deviation amounts ΔXa and ΔXb are −3 and +2, a plurality of nozzle NZ of the second head unit 242 from the nozzle B1 to the nozzle C8 are determined as the use nozzles of the second head unit 242, and the nozzles B0, C9 and C10 are determined as the non-use nozzles of the second head unit 242. In a case where the positional deviation amount ΔXb is +2, a plurality of nozzle NZ of the third head unit 243 from the nozzle D5 to the nozzle NZ at the upstream end in the X direction are determined as the use nozzles of the third head unit 243, and the nozzles D0 to D4 are determined as the non-use nozzles of the third head unit 243.

The CPU 110 sets the use nozzles and the non-use nozzles by recording at least the determined use nozzles or non-use nozzles in a not-shown setting file. As a result, subsequent printings will be executed by using the use nozzles and not using the non-use nozzles.

According to the present embodiment described above, the CPU 110 executes a printing process of causing the printing mechanism 200 to print the test image TI (i.e., S210 in FIG. 9), an acquisition process of acquiring the positional deviation amount ΔXa (i.e., S220 in FIG. 9), and a setting process of setting, from among a plurality of nozzle NZ of the first head unit 241 and the plurality of nozzle NZ of the second head unit 242, a use nozzle and a non-use nozzle using the positional deviation amount ΔXa (i.e., S230 and S240 in FIG. 9).

As a result, even if, for example, positional deviation in the X direction occurs between the first head unit 241 and the second head unit 242 due to variations in mounting positions during assembly, the use nozzle and the non-use nozzle can be appropriately determined from a plurality of nozzle NZ including two or more nozzle groups NGn configured to eject ink of the same color (in the present embodiment, K ink) and having different positions in the Y direction. Therefore, even if, for example, there is the positional deviation in the X direction between the first head unit 241 and the second head unit 242, it is possible to prevent degradation in image quality of an image printed by the printing mechanism 200.

In the present embodiment, the use nozzles and the non-use nozzles in the overlapping range of the first head unit 241 and the second head unit 242 are determined by determining the left-side boundary nozzle pair based on the distance between the nozzles NZ of the first head unit 241 and the nozzles NZ of the second head unit 242 in the conveying direction (i.e., Y direction) and the range in the X direction that can be printed using only the nozzles NZ of the second head unit 242 (i.e., S125 to S140 in FIG. 7).

The nozzle NZ of the first head unit 241 constituting the left-side boundary nozzle pair is also referred to as a first boundary nozzle, and the nozzle NZ of the second head unit 242 constituting the left-side boundary nozzle pair is also referred to as a second boundary nozzle. The longer a distance between the first boundary nozzle and the second boundary nozzle in the conveying direction is, the more likely a position of a first boundary dot formed using the first boundary nozzle and a position of a second boundary dot formed using the second boundary nozzle on the sheet M deviate relative to each other in the conveying direction. For example, a case where the first boundary dot and the second boundary dot are formed at the same position on the sheet M in the conveying direction will be considered. In this case, in a case where the positions of the first boundary nozzle and the second boundary nozzle are different in the conveying direction, timings of ink ejection from the two boundary nozzles are controlled to be different in consideration of a distance between the two boundary nozzles in the conveying direction and a conveying speed of the sheet M. The longer the distance between the first boundary nozzle and the second boundary nozzle in the conveying direction, the greater the difference in the timings at which ink is ejected from the two boundary nozzles. The larger the difference in the timings, the more likely the positions of the first and second boundary dots deviate relative to each other when variation in the conveying speed of the sheet M occurs or the sheet M is conveyed obliquely with respect to an ideal conveying direction. When the positions of the first and second boundary dots deviate relative to each other, a streak called banding is likely to appear between an image formed using the nozzles NZ of the first head unit 241 and the image formed using the nozzles NZ of the second head unit 242. As described above, the longer the distance between the first and second boundary nozzles in the conveying direction, the more likely the image quality of the printed image degrades due to the banding. In the present embodiment, the left-side boundary nozzle pair is determined so that the distance between the first and second boundary nozzles in the conveying direction becomes the shortest (i.e., S125 in FIG. 7). As a result, the occurrence of the banding in the printed image can be suppressed and thus the degradation of the image quality of the printed image can be suppressed.

In a case where the image can be printed using only the nozzles NZ of the second head unit 242, the above-described banding caused by the relative deviation of the positions of the first boundary dot and the second boundary dot does not occur. Therefore, in the case where the image to be printed can be printed using only the nozzles NZ of the second head unit 242 such as a case where a width in the X direction of an image to be printed is relatively small, it is preferable to print using only the nozzles NZ of the second head unit 242. The wider a range that can be printed using only the nozzles NZ of the second head unit 242 in the X direction, the higher the possibility that an image can be printed using only the nozzles NZ of the second head unit 242. Therefore, in the present embodiment, in a case where there are two or more candidate pairs for the left-side boundary nozzle pair with the shortest inter-nozzle distance, a candidate pair, among the two or more candidate pairs, which make the range that can be printed using only the nozzles NZ of the second head unit 242 wider in the X direction is determined as the left-side boundary nozzle pair. For example, in the present embodiment, the outermost candidate pair among the two or more candidate pairs is determined as the left-side boundary nozzle pair (i.e., S140 in FIG. 7). As a result, it is possible to further suppress the occurrence of the banding in the printed image, thereby further suppressing the deterioration of the image quality of the printed image.

In the present embodiment, the boundary nozzle pair is determined in advance based on the above-described distance between the boundary nozzles in the conveying direction and the range in which printing can be performed using only the nozzles NZ of the second head unit 242, and the reference table RT in which the boundary nozzle pair is recorded for each positional deviation amount is generated (see FIGS. 7 and 8). The printer 600 includes a non-volatile storage device 130 (see FIG. 1) in which the reference table RT is stored, and the CPU 110 refers to the reference table RT to determine the use nozzles and the non-use nozzles (i.e., S230 and S340 in FIG. 9). As a result, it is not necessary for the CPU 110 to calculate the distance between the boundary nozzles in the conveying direction and specify the range in which printing can be performed using only the nozzles NZ of the second head unit 242 in the nozzle setting process. As a result, appropriate use nozzles and non-use nozzles can be quickly determined.

In the present embodiment, the CPU 110 executes the acquisition process of acquiring the positional deviation amount $\Delta Xb$ (i.e., S220 in FIG. 9) and a setting process of setting the use nozzles and the non-use nozzles from among the plurality of nozzle NZ of the second head unit 242 and the plurality of nozzle NZ of the third head unit 243 based on the positional deviation amount $\Delta Xb$ (i.e., S230 and S240 in FIG. 9). A nozzle NZ of the second head unit 242 constituting the right-side boundary nozzle pair is also referred to as a third boundary nozzle, and a nozzle NZ of the third head unit 243 constituting the right-side boundary nozzle pair is also referred to as a fourth boundary nozzle. The use nozzles and the non-use nozzles are determined so that a distance between the third boundary nozzle and the fourth boundary nozzle in the conveying direction becomes the shortest (i.e., S125 in FIG. 7). As a result, occurrence of the banding between an image to be printed using the second head unit 242 and an image to be printed using the third head unit 243 can be suppressed, thereby further suppressing the deterioration of the image quality of the printed image.

In the present embodiment, the left-side boundary nozzle pair is determined based on the positional deviation amount $\Delta Xa$ and the right-side boundary nozzle pair is determined based on the positional deviation amount $\Delta Xb$ independently of each other. Therefore, the distance in the conveying direction between the first boundary nozzle and the second boundary nozzle constituting the left-side boundary nozzle pair and the distance in the conveying direction between the third boundary nozzle and the fourth boundary nozzle constituting the right-side boundary nozzle pair may be different. As described above, in the present embodiment, the left-side boundary nozzle pair (i.e., the first boundary nozzle and the second boundary nozzle) and the right-side boundary nozzle pair (i.e., the third boundary nozzle and the fourth boundary nozzle) can be appropriately determined. Therefore, it is possible to further suppress the banding from being conspicuous in the printed image.

In the present embodiment, in a case where there are two or more candidate pairs for the left-side boundary nozzle pair for the second and third head units 242 and 243 with the shortest inter-nozzle distance, among the two or more candidate pairs, a candidate pair which makes a width in the X direction of a printable range using only the nozzles NZ of the second head unit 242 the widest is determined as the right-side boundary nozzle pair. As a result, it is possible to further suppress the occurrence of the banding in the printed image, and thus it is possible to further suppress the deterioration of the image quality of the printed image.

In the present embodiment, as described above, the conveyer 210 of the printing mechanism 200 conveys the sheet M so that the center of the sheet M in the X direction coincides with the center of the second head unit 242 of the print head 240 (i.e., the center line CL). In other words, a print medium having a length in the X direction shorter than the range RG2 within which the nozzles NZ of the second head unit 242 are located is conveyed at a position in the X direction in which printing is possible using only the nozzles NZ of the second head unit 242. As a result, it is possible to increase the possibility that the printed can be performed using only the nozzles NZ of the second head unit 242. Therefore, it is possible to further suppress deterioration of the image quality of the printed image.

As can be understood from the above description, the test image TI of the present embodiment is an example of a specific image according to aspects of the present disclosure, the left image LI(q) is an example of a first image according to aspects of the present disclosure, the center image CI(q) is an example of a second image according to aspects of the present disclosure, and the right image RI(q) is an example of a third image according to aspects of the present disclosure. The X direction of the present embodiment is an example of a specific direction according to aspects of the present disclosure, and the Y direction is an example of an intersecting direction according to aspects of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

B. MODIFICATION (1) The configuration of the print head 240 of the above embodiment is an example, and various modifications are possible. For example, in the above embodiment, the first to third head units 241 to 243 have the same configuration, but may have different configurations. For example, the numbers of nozzles NZ formed to the first to third head units 241 to 243 may be different from each other, or the numbers of nozzle groups NGn formed to the first to third head units 241 to 243 may be different from each other. Generally, what is required is that the first head unit 241 includes N1 nozzles NZ (where N1 is an integer of 4 or more) and includes two or more nozzle groups having different positions in the Y direction, that the second head unit 242 includes N2 nozzles NZ (where N2 is an integer of 4 or more) and includes two or more nozzle groups having different positions in the Y direction, and that the third head unit 243 includes N3 nozzles NZ (where N3 is an integer of 4 or more) and includes two or more nozzle groups having different positions in the Y direction.

(2) The number of head units provided to the print head in the above embodiment is three, but may be two or four or more. For example, in a case where the number of head units is two, the use nozzles and the non-use nozzles of the two head units are, for example, determined based on the boundary nozzle pair between the head unit on the right side and the head unit on the left side. Then, for example, a sheet is conveyed so that a left end of the sheet coincides with a vicinity of a left end of the head unit on the left side. In this case, in a case where there are a plurality of candidate pairs with the shortest inter-nozzle distance, a candidate pair which makes the number of use nozzles of the head unit on the left side the largest is determined as the boundary nozzle pair. In other words, a candidate pair which makes a width in the X direction of a printable range using only the head unit on the left side the widest is determined as the boundary nozzle pair.

(3) In the above embodiment, the boundary nozzle pair is determined so that the distance in the conveying direction between the nozzles constituting the boundary nozzle pair becomes the shortest, and if there are a plurality of candidate pair with the shortest inter-nozzle distance, a candidate pair which makes the width in the X direction of the printable range using only the second head unit 242 the widest is determined as the boundary nozzle pair. However, the method for determining the boundary nozzle pair is not limited to the above. For example, the boundary nozzle pair may be determined so that all the nozzles NZ of the second head unit 242 are used in principle so that the width in the X direction of the printable range using only the second head unit 242 becomes wide. In this case, only when the distance in the conveying direction between the boundary nozzles is equal to or greater than a particular threshold value (e.g., 30 mm), the outermost candidate pair with the inter-nozzle distance of equal to or less than the particular threshold value may be determined as the boundary nozzle pair. Alternatively, if, according to the design value, there are a plurality of candidate pair with the shortest inter-nozzle distance, measured values of the inter-nozzle distances of the plurality of candidate pair may be obtained, and among these candidate pairs, the candidate pair which the measured value of the inter-nozzle distance is the shortest may be determined as the boundary nozzle pair. That is, the boundary nozzle pair may be determined based only on the inter-nozzle distance of the candidate pair. Generally, it is preferable that the boundary nozzle pair is determined based on one of the inter-nozzle distances of the candidate pairs, the width of the printable range using only the second head unit 242, and both the inter-nozzle distances of the candidate pairs and the width of the printable range using only the second head unit 242.

(4) In the above embodiment, the CPU 110 refers to the reference table RT to determine the boundary nozzle pair (see FIG. 9). Alternatively, in a case where the positional deviation amounts ΔXa and ΔXb are received, the CPU 110 may determine the boundary nozzle pair by executing S115 to S140 in FIG. 7 with the positional deviation amounts ΔXa and ΔXb as the focused deviation amounts.

(5) In the above embodiment, the steps for generating the reference table shown in FIG. 7 is executed by the operator. However, some or all of these steps may be realized by the CPU 110 executing a program for generating the reference table.

(6) In the above embodiment, the nozzle setting process shown in FIG. 9 is executed by the CPU 110 of the printer 600. Alternatively, the nozzle setting process may be executed by a computing machinery (e.g., a terminal device such as a personal computer or a smartphone, or a server such as a cloud server) communicably connected to the printer 600. In this case, for example, the computing machinery sets the use nozzles and the non-use nozzles in the printer 600 by transmitting, to the printer 600, a setting file in which the use nozzles and the non-use nozzles are recorded. As described above, in the above embodiment, the controller 100 of the printer 600 is an example of a setting device according to aspects of the present disclosure, and the printing mechanism 200 is an example of a print engine according to aspects of the present disclosure. In the present modification, the computing machinery executing the nozzle setting process is an example of the setting device according to aspects of the present disclosure, and the printer 600 is an example of the print engine.

(7) In each of the above embodiment and modifications, a part of the configuration realized by the hardware may be replaced with software, and conversely, a part or all of the configuration realized by the software may be replaced with hardware.

What is claimed is:

1. A setting device for a print engine including a print head provided with a plurality of head unit including a first head unit provided with N1 first nozzles, N1 being an integer of 4 or more, located at positions different from each other in a specific direction and a second head unit provided with N2 second nozzles, N2 being an integer of 4 or more, located at positions different from each other in the specific direction, wherein:

the first head unit and the second head unit are located at positions different from each other in an intersecting direction intersecting with the specific direction,
a first range includes a first overlapping range and a first non-overlapping range,
the first overlapping range overlaps with a second range in the specific direction,
the first non-overlapping range does not overlap with the second range in the specific direction,
the N1 first nozzles are located in the first range,
the N2 second nozzles are located in the second range,
the N1 first nozzles and the N2 second nozzles are nozzles that eject ink of the same color,
the N1 first nozzles include two or more nozzle groups being at positions different from each other in the intersecting direction, and
the N2 second nozzles include two or more nozzle groups being at positions different from each other in the intersecting direction,
wherein the setting device is configured to:
cause the print engine to print a specific image, the specific image including a first image to be printed using at least some of the N1 first nozzles and a second image to be printed using at least some of the N2 second nozzles;
receive relative position information determined based on the printed specific image, the relative position information including information indicating a positional deviation amount in the specific direction between the N1 first nozzles and the N2 second nozzles; and
set, based on the relative position information, use nozzles to be used for printing and non-use nozzles not to be used for printing among the first nozzles and the second nozzles within the first overlapping range.

2. The setting device according to claim 1, wherein:
the use nozzles and the non-use nozzles are set by a first boundary nozzle and a second boundary nozzle that are determined based on one of a distance between the first nozzle and the second nozzle in the intersecting direction, a width of a specific range in the specific direction, and both the distance between the first nozzle and the second nozzle in the intersecting direction and the width of the specific range in the specific direction,
printing can be performed using only the second nozzles among the use nozzles in the specific range,
the first boundary nozzle is one of the N1 first nozzles and is located at a boundary between a range within the first range in which the use nozzles are located and a range within the second range in which the use nozzles are located, and
the second boundary nozzle is one of the N2 second nozzles and is located at the boundary.

3. The setting device according to claim 2, further comprising a storage configured to store a table, wherein:
the first boundary nozzle and the second boundary nozzle are recorded for each positional deviation amount in the table, the first boundary nozzle and the second boundary nozzle determined based on one of the distance between the first nozzle and the second nozzle in the intersecting direction, the width of the specific range in the specific direction, and both the distance between the first nozzle and the second nozzle in the intersecting direction and the width of the specific range in the specific direction, and
the use nozzle and the non-use nozzle are set with reference to the table.

4. The setting device according to claim 2, wherein the first boundary nozzle and the second boundary nozzle are determined such that a distance between the first boundary nozzle and the second boundary nozzle in the intersecting direction becomes the shortest.

5. The setting device according to claim 4, wherein, in a case where there are two or more pairs of the first nozzle and the second nozzle to be candidate pairs for the first boundary nozzle and the second boundary nozzle with a shortest inter-nozzle distance, the inter-nozzle distance being a distance in the intersecting direction between the first nozzle and the second nozzle constituting the candidate pair, the first nozzle and the second nozzle of one of the candidate pairs with the shortest inter-nozzle distance, making the specific range the widest, are determined as the first boundary nozzle and the second boundary nozzle, respectively.

6. The setting device according to claim 4, wherein:
the print head further includes a third head unit including N3 third nozzles, N3 being an integer of 4 or more, located at positions different from each other in the specific direction,
the third head unit and the second head unit are located at positions different from each other in the intersecting direction,
a third range includes a second overlapping range and a second non-overlapping range,
the second overlapping range overlaps with the second range,
the second non-overlapping range does not overlap with the second range,
the N3 third nozzles are located in the third range,
the N3 third nozzles and the N2 second nozzles are nozzles that ejects ink of the same color,
the N3 third nozzles include two or more nozzle groups being at positions different from each other in the intersecting direction,
the second range is located between the first non-overlapping range and the second non-overlapping range,
the specific image further includes a third image to be printed using at least some of the N3 third nozzles,
the relative position information includes information indicating a positional deviation amount in the specific direction between the N3 third nozzles and the N2 second nozzles,
the setting device is configured to set, based on the relative position information, second use nozzles to be used for printing and second non-use nozzles not to be used for printing among the N2 second nozzles and the N3 third nozzles within the second overlapping range,
the second use nozzles and the second non-use nozzles are set such that a distance between a third boundary nozzle and a fourth boundary nozzle in the intersecting direction becomes the shortest,
the third boundary nozzle is one nozzle of the N3 third nozzles and is located at a second boundary between the second range and the second non-overlapping range of the third range, and
the fourth boundary nozzle is one of the N2 second nozzles and is located at the second boundary.

7. The setting device according to claim 6, wherein a distance between the first boundary nozzle and the second boundary nozzle in the specific direction is different from a distance between the third boundary nozzle and the fourth boundary nozzle in the intersecting direction.

8. The setting device according to claim 6, wherein:
In a case where there are two or more pairs of the first nozzle and the second nozzle to be candidate pairs for the first boundary nozzle and the second boundary nozzle with a shortest inter-nozzle distance, the inter-nozzle distance being a distance in the intersecting direction between the first nozzle and the second nozzle constituting the candidate pair, the first nozzle and the second nozzle of one of the candidate pairs with the shortest inter-nozzle distance, making the specific range the widest, are determined as the first boundary nozzle and the second boundary nozzle, respectively, and
in a case where there are two or more pairs of the third nozzle and the second nozzle to be second candidate pairs for the third boundary nozzle and the fourth boundary nozzle with a shortest second inter-nozzle distance, the second inter-nozzle distance being a distance in the intersecting direction between the third nozzle and the second nozzle constituting the second candidate pair, the third nozzle and the second nozzle of one of the second candidate pairs with the shortest second inter-nozzle distance, making the specific range the widest, are determined as the third boundary nozzle and the fourth boundary nozzle, respectively.

9. The setting device according to claim 1, wherein:
the print engine includes a conveyer configured to convey a printing medium in the intersecting direction,
the conveyer conveys the print medium at a position in the specific direction where printing on the print medium can be performed using only the N2 second nozzles, and a width of the print medium in the specific direction is shorter than a width of the second range in the specific direction, the N2 second nozzles located in the second range.

10. A non-transitory computer readable recording medium storing computer-readable instructions for a computer configured to control a print engine including a print head provided with a plurality of head unit including a first head unit provided with N1 first nozzles, N1 being an integer of 4 or more, located at positions different from each other in a specific direction and a second head unit provided with N2, second nozzles N2 being an integer of 4 or more, located at positions different from each other in the specific direction, wherein:

the first head unit and the second head unit are located at positions different from each other in an intersecting direction intersecting with the specific direction, a first range includes a first overlapping range and a first non-overlapping range, the first overlapping range overlaps with a second range in the specific direction, the first non-overlapping range does not overlap with the second range in the specific direction, the N1 first nozzles are located in the first range, the N2 second nozzles are located in the second range, the N1 first nozzles and the N2 second nozzles are nozzles that eject ink of the same color, the N1 first nozzles include two or more nozzle groups being at positions different from each other in the intersecting direction, and the N2 second nozzles include two or more nozzle groups being at positions different from each other in the intersecting direction, wherein the computer-readable instructions cause the computer to:

cause the print engine to print a specific image, the specific image including a first image to be printed using at least some of the N1 first nozzles and a second image to be printed using at least some of the N2 second nozzles;

receive relative position information determined based on the printed specific image, the relative position information including information indicating a positional deviation amount in the specific direction between the N1 first nozzles and the N2 second nozzles; and set, based on the relative position information, use nozzles to be used for printing and non-use nozzles not to be used for printing among the first nozzles and the second nozzles within the first overlapping range.

11. A setting method for a print engine including a print head provided with a plurality of head unit including a first head unit provided with N1 first nozzles, N1 being an integer of 4 or more, located at positions different from each other in a specific direction and a second head unit provided with N2 second nozzles, N2 being an integer of 4 or more, located at positions different from each other in the specific direction, wherein:

the first head unit and the second head unit are located at positions different from each other in an intersecting direction intersecting with the specific direction, a first range includes a first overlapping range and a first non-overlapping range, the first overlapping range overlaps with a second range in the specific direction, the first non-overlapping range does not overlap with the second range in the specific direction, the N1 first nozzles are located in the first range, the N2 second nozzles are located in the second range, the N1 first nozzles and the N2 second nozzles are nozzles that eject ink of the same color, the N1 first nozzles include two or more nozzle groups being at positions different from each other in the intersecting direction, and the N2 second nozzles include two or more nozzle groups being at positions different from each other in the intersecting direction, wherein the setting method includes:

causing the print engine to print a specific image, the specific image including a first image to be printed using at least some of the N1 first nozzles and a second image to be printed using at least some of the N2 second nozzles;

receiving relative position information determined based on the printed specific image, the relative position information including information indicating a positional deviation amount in the specific direction between the N1 first nozzles and the N2 second nozzles; and setting, based on the relative position information, use nozzles to be used for printing and non-use nozzles not to be used for printing among the first nozzles and the second nozzles within the first overlapping range.

\* \* \* \* \*